United States Patent

Chassang

[15] 3,690,444
[45] Sept. 12, 1972

[54] PRESSER BELT FOR FIRMLY ENGAGING ARTICLES WITH A CONVEYOR

[72] Inventor: Pierre Robert Chassang, Val de Marne, France

[73] Assignee: Tissmetal Lionel-Dupont, Lyon, Rhone, France

[22] Filed: May 11, 1971

[21] Appl. No.: 142,285

[30] Foreign Application Priority Data

May 14, 1970 France......................7017611

[52] U.S. Cl...................................198/165, 198/201
[51] Int. Cl.........................B65g 15/14, B65g 15/40
[58] Field of Search.......198/165, 191, 192, 196, 201

[56] References Cited

UNITED STATES PATENTS 3,362,585   9/1968   Nessim et al. ..............222/55

Primary Examiner—Evon C. Blunk
Assistant Examiner—H. S. Lane
Attorney—Stevens, Davis, Miller & Mosher

[57] ABSTRACT

A presser belt for firmly pressing articles such as luggage against a belt conveyor, comprising a plurality of transverse elastic cables and a flexible concertina-folded band secured to the cables on the conveyor side and which can extend as the cables are stretched over conveyed articles, to prevent the cables catching on corners or edges of the articles. There may be another such band on the other side of the cables, the two bands being connected together to form tubular pockets for the cables.

8 Claims, 4 Drawing Figures

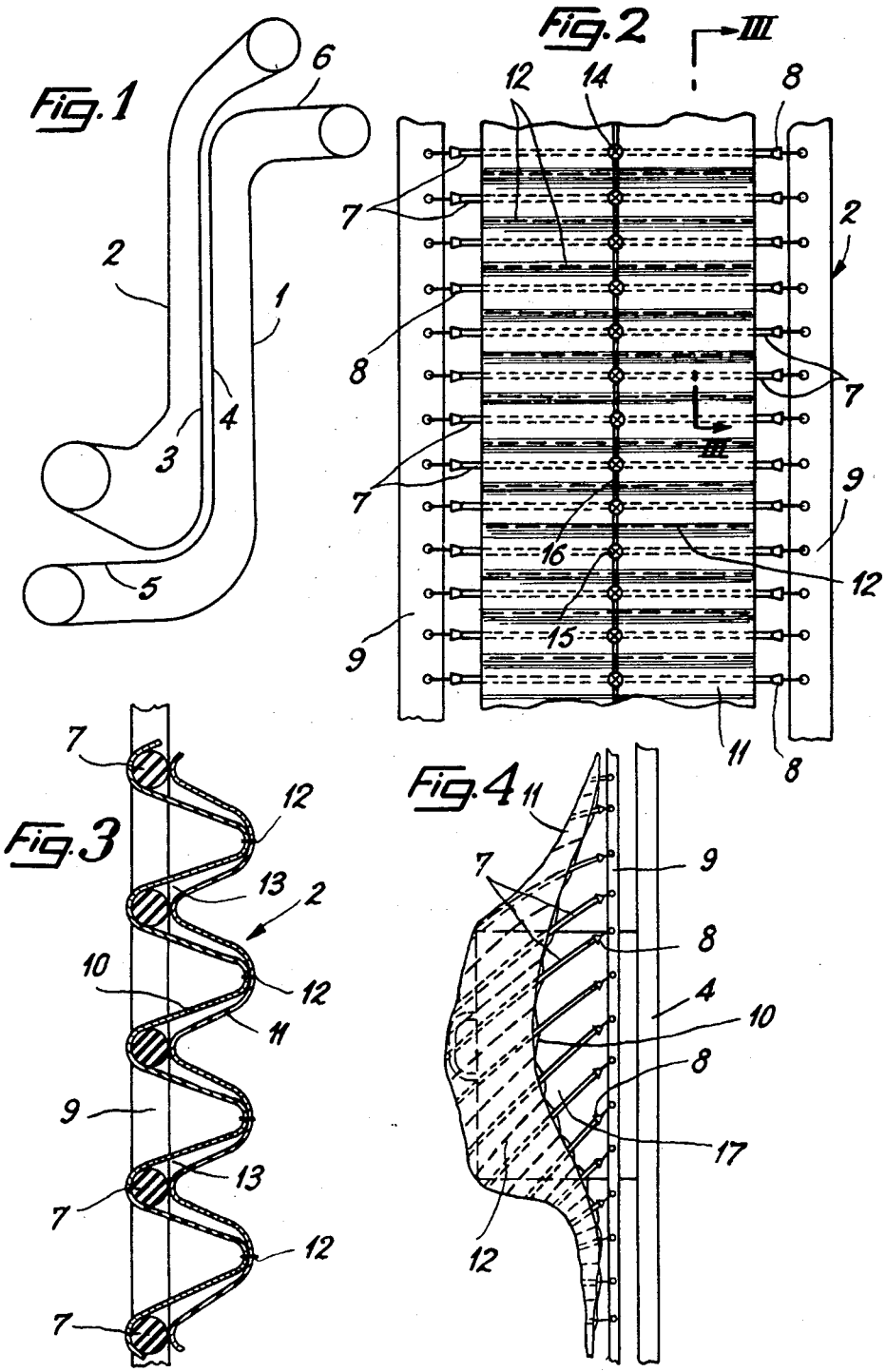

PRESSER BELT FOR FIRMLY ENGAGING ARTICLES WITH A CONVEYOR

This invention relates to an elastic pressure belt for firmly engaging with an endless conveyor the articles borne thereby. A presser belt of this kind is used inter alia in cases in which the conveyor has parts other than horizontal, for instance vertical parts for raising or lowering the articles borne by the conveyor. In such cases the presser belt is arranged so that one of its runs is parallel to a non-horizontal part of the conveyor.

In some known conveyors, an endless presser belt comprises interlaced elastic filaments or cables, such as extensible rubber springs, disposed between two longitudinal edges maintained parallel to one another at a constant spacing and sufficiently flexible to run over rollers and form an endless belt. The edges can be chains which also serve to move the presser belt synchronously with the conveyor. Known presser belts of this kind have a serious disadvantage; namely that projecting and pointed parts of the conveyed articles catch in the rubber springs, so there is a risk of light articles becoming caught up by the presser belt instead of staying on the conveyor at places where the latter diverges from the presser belt, while heavy articles may damage the presser belt by carrying away the rubber springs.

It is an object of the present invention to obviate this disadvantage.

According to the present invention, an endless elastic presser belt for firmly engaging with an endless conveyor the articles borne by the latter is so disposed in part of its path to be substantially parallel to part of the path of the conveyor, has elastic cross-members disposed between two longitudinal edges maintained parallel to one another at a constant spacing, and also comprises a flexible band secured to the elastic cross-members on the side facing the conveyor.

The flexible band prevents the conveyed articles from catching in the elastic cross-members.

Preferably, the flexible band is longer than the length of the presser belt. The flexible band can therefore follow deformations of the elastic cross-members when bulky articles are disposed between the presser belt and the conveyor.

The presser belt may comprise a plurality of elastic cross-members which normally are parallel to one another and which extend transversely with respect to the direction of movement of the presser belt; and the flexible band, when not engaging articles firmly with the conveyor, forms folds between the elastic cross-members.

Preferably, the presser belt also comprises a second flexible band which is disposed on the side of the elastic cross-members remote from the conveyor, the second flexible band being connected to the first flexible band by seams or other lines of fastenings which are parallel to and disposed between the elastic cross members so that each such cross-member is disposed in a tubular pocket formed by the flexible bands.

Preferably, the two flexible bands are both longer than the length of the presser belt and can therefore follow deformations caused by the articles being conveyed.

The elastic cross-members preferably are secured at or near their centers to the flexible band system. The flexible bands can therefore be kept centered relatively to the elastic cross-members, and articles whose size is greater than the maximum extension of the bands can still be conveyed, the elastic cross-members elongating and sliding in the tubular pockets of the bands so as to extend for the most part outside the pockets.

The invention can be performed in various ways, and a specific embodiment will now be described by way of example with reference to drawings, wherein:

FIG. 1 is a diagrammatic view of a conveyor arrangement for which the invention is of use;

FIG. 2 shows a part of a presser belt according to the invention;

FIG. 3 is a cross-section on the line III—III of FIG. 2; and

FIG. 4 shows a vertical portion of a conveyor provided with a presser belt according to the invention and which is conveying an article of luggage.

The conveyor arrangement shown diagrammatically in FIG. 1 provides vertical conveyance and comprises an endless conveyor 1, which can be of the endless belt or articulated plate kind, and an endless presser belt 2, the presser belt 2 and the conveyor 1 having parallel vertical parts 3 and 4, respectively. The presser belt 2 is so arranged that its part 3 can engage articles (not shown in FIG. 1) with the conveyor part 4 so that such articles will be conveyed from a bottom horizontal run 5 to a top horizontal run 6 of the conveyor (raising) or vise versa (lowering).

The presser belt 2 according to the invention, portions of which are shown in FIGS. 2 and 3, has elastic cross-members 7, e.g., extensible rubber springs, whose ends 8 are secured to parallel edges 9 which are maintained parallel to one another and to the conveyor part 4. The cross-members 7 are normally parallel to one another and perpendicular to the direction of movement of the presser belt 2. The parallel edges 9 can be side drive chains.

The presser belt 2 also comprises two flexible, e.g., plastics, bands 10, 11 which are disposed on opposite sides of and extend substantially the distance between the elastic cross-members 7 and which are interconnected by connexions 12, for instance, by sewing or stitching or welding, along lines which are perpendicular to the direction of the presser belt movement and which are disposed between the cross-members 7. Each cross-member 7 is therefore disposed in a tubular pocket 13 which extends transversely with respect to the direction of presser belt movement.

The flexible bands 10, 11 are longer than the length of the presser belt and form accordion-like folds between the cross-members 7. The flexible band 11 is formed with apertures 14 along its longitudinal centerline, and the central parts of the cross-members 7 are accessible through the apertures 14 and are secured, e.g., by knots 15, to a longitudinal elastic connecting member 16 disposed on that surface of the band 11 which is remote from the cross-members 7. The system formed by the bands 10, 11 is therefore rigidly secured to the cross-members 7 by the pockets 13 and by the knots 15.

Consequently, when a bulky article, such as a suitcase 17, is raised or lowered on the conveyor 1, the flexible band system 10, 11 expands within the limits permitted by its "off-load" folds, and beyond such limits the stretched cross-members 7 emerge laterally from the pockets, the knots 15 keeping the cross-members properly centered.

Below the articles 17, the cross-members 7 so press the band system 10, 11 that it follows the article shape intimately, thus preventing slip of the article on the conveyor part 4.

What We claim as our invention and desire to secure by Letters Patent is:

1. An endless movable elastic presser belt for firmly engaging with an endless movable conveyor the articles borne by said conveyor, said belt being disposed in part of its path substantially parallel to part of the path of said conveyor, said presser belt comprising two longitudinal edges maintained parallel to one another at a constant spacing, elastic cross-members disposed transversely between said longitudinal edges, and flexible band means substantially spanning said spacing and secured to said elastic cross-members between said elastic cross-members and said conveyor.

2. A belt according to claim 1, in which said flexible band is longer than the length of said edges.

3. A belt according to claim 1, which comprises a plurality of elastic cross-members which normally are parallel to one another and which extend transversely with respect to the direction of movement of said presser belt; and said flexible band, when not engaging said articles firmly with said conveyor, forms folds between said elastic cross-members.

4. A belt according to claim 3, which also comprises a second flexible band disposed on said elastic cross-members on the side thereof remote from said conveyor, and in which connecting means connect said second flexible band to said first flexible band along lines parallel to and disposed between said elastic cross-members whereby each of said elastic cross-members is disposed in a tubular pocket formed by said flexible bands.

5. A belt according to claim 4, in which said flexible bands are both longer than the length of said edges.

6. A belt according to claim 4, in which said elastic cross-members are secured adjacent their centers to said flexible bands.

7. A belt according to claim 6, in which said second flexible band has apertures aligned along its longitudinal center-line, said centers of said elastic cross-members being accessible through said apertures, and said elastic cross-members being secured to a longitudinal elastic connecting member disposed on said second band on the side thereof remote from said elastic cross-members.

8. An assembly comprising an endless movable conveyor and an endless movable elastic presser belt according to claim 1.

* * * * *